(12) United States Patent
Neidrich et al.

(10) Patent No.: US 7,576,902 B2
(45) Date of Patent: Aug. 18, 2009

(54) SPATIAL LIGHT MODULATOR MIRROR METAL HAVING ENHANCED REFLECTIVITY

(75) Inventors: Jason M. Neidrich, Fairview, TX (US); Lance W. Barron, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/517,523

(22) Filed: Sep. 6, 2006

(65) Prior Publication Data

US 2008/0055704 A1 Mar. 6, 2008

(51) Int. Cl.
*G02B 26/00* (2006.01)
*G02B 26/08* (2006.01)
*G02F 1/29* (2006.01)

(52) U.S. Cl. .................... 359/291; 359/292; 359/298

(58) Field of Classification Search ......... 359/290–292, 359/295, 298, 223, 224
See application file for complete search history.

(56) References Cited

U.S. PATENT DOCUMENTS

| | | | | |
|---|---|---|---|---|
| 4,335,506 A | * | 6/1982 | Chiu et al. | 438/652 |
| 4,617,193 A | * | 10/1986 | Wu | 438/631 |
| 5,576,878 A | | 11/1996 | Henck | |
| 5,604,625 A | | 2/1997 | Henck | |
| 6,072,617 A | | 6/2000 | Henck | |
| 6,229,650 B1 | | 5/2001 | Reznichenko et al. | |
| 6,894,822 B2 | | 5/2005 | Blech et al. | |
| 6,962,419 B2 | * | 11/2005 | Huibers | 353/99 |
| 7,151,628 B2 | * | 12/2006 | Heureux | 359/291 |

OTHER PUBLICATIONS

Barron, L., Thesis entitled: "High-Reflectance, Sputter-Deposited Aluminum Alloy Thin Films for Micro-Electro-Mechanical System", Materials Science & Engineering Dept., Rochester Institute of Technology, 213 pages.
Barron, L.; "High-Reflectance, Sputter-Deposited Aluminum Alloy Thin Films for Micro-Electro-Mechanical Systems;" MS Materials Science & EngineeringThesis Defense PowerPoint presentation; 45 pages.

* cited by examiner

*Primary Examiner*—Scott J Sugarman
*Assistant Examiner*—Brandi N Thomas
(74) *Attorney, Agent, or Firm*—Dawn V. Stephens; Wade James Brady, III; Frederick J. Telecky, Jr.

(57) ABSTRACT

In accordance with the teachings of the present invention, a spatial light modulator mirror metal having enhanced reflectivity is provided. In a particular embodiment of the present invention, a light processing system includes a light source operable to provide a light beam along a light path and a spatial light modulator positioned in the light path, the spatial light modulator comprising an array of pixel elements, each pixel element comprising a deformable micro-mirror operable to reflect the light beam in at least one direction. At least a portion of each deformable micro-mirror comprises an Al—Cu alloy. A controller electrically connected to the spatial light modulator is operable to provide electrical signals to the spatial light modulator to cause the spatial light modulator to selectively deform the pixel elements, thereby selectively reflecting incident light beams along a projection light path.

16 Claims, 1 Drawing Sheet

SPATIAL LIGHT MODULATOR MIRROR METAL HAVING ENHANCED REFLECTIVITY

TECHNICAL FIELD

This invention relates generally to microelectromechanical systems and, more particularly, to a spatial light modulator mirror metal having an enhanced reflectivity.

BACKGROUND

Spatial light modulators are devices that may be used in a variety of optical communication and/or video display systems. These devices generate an image by controlling a plurality of individual elements that deflect light to form the various pixels of the image. One example of a spatial light modulator is a digital micro-mirror device ("DMD"), which uses a plurality of micro-mirrors to deflect light to form the various pixels of the image. Typically, each micro-mirror in the DMD comprises a layer of aluminum or an aluminum alloy, such as Al:Si:Ti in the ratio of about 98.6:1:0.2. Oftentimes it is desirable to increase the reflectivity of the micro-mirror over that provided by conventional alloys; however, a variety of material constraints may limit the chosen composition of the micro-mirror.

SUMMARY OF EXAMPLE EMBODIMENTS

In accordance with the teachings of the present invention, a spatial light modulator mirror metal having enhanced reflectivity is provided. According to a particular embodiment of the present invention, a light processing system comprises a light source operable to provide a light beam along a light path and a spatial light modulator positioned in the light path, the spatial light modulator comprising an array of pixel elements, each pixel element comprising a deformable micro-mirror operable to reflect the light beam in at least one direction. At least a portion of each deformable micro-mirror comprises an Al—Cu alloy. A controller electrically connected to the spatial light modulator is operable to provide electrical signals to the spatial light modulator to cause the spatial light modulator to selectively deform the pixel elements, thereby selectively reflecting incident light beams along a projection light path.

A technical advantage of some embodiments of the invention includes increased micro-mirror reflectivity compared to conventional Al:Si:Ti alloy micro-mirrors. In particular embodiments, this may be achieved while satisfying various material constraints associated with conventional DMD processing, such as reducing film stress, improving micro-hardness relative to pure aluminum, and being compatible with semiconductor processing.

Another technical advantage of some embodiments of the invention the ability to offer this increased reflectivity without an increase in the amount of hillocking in the alloy used to fabricate micro-mirrors. In particular embodiments, the amount of hillocking in the micro-mirror alloy may actually be reduced.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

In accordance with the teachings of the present invention, a spatial light modulator having an improved micro-mirror member and a method for the same are provided. In a particular embodiment of the present invention, a light processing system comprises a light source operable to provide a light beam along a light path and a spatial light modulator positioned in the light path, the spatial light modulator comprising an array of pixel elements, each pixel element comprising a deformable micro-mirror operable to reflect the light beam in at least one direction. At least a portion of each deformable micro-mirror comprises an Al—Cu alloy. A controller electrically connected to the spatial light modulator is operable to provide electrical signals to the spatial light modulator to cause the spatial light modulator to selectively deform the pixel elements, thereby selectively reflecting incident light beams along a projection light path. By utilizing a Al—Cu alloy, particular embodiments of the present invention are able to offer increased reflectivity over conventional Al:Si:Ti alloys, with reduced hillocking of the micro-mirror material.

Figure 1:
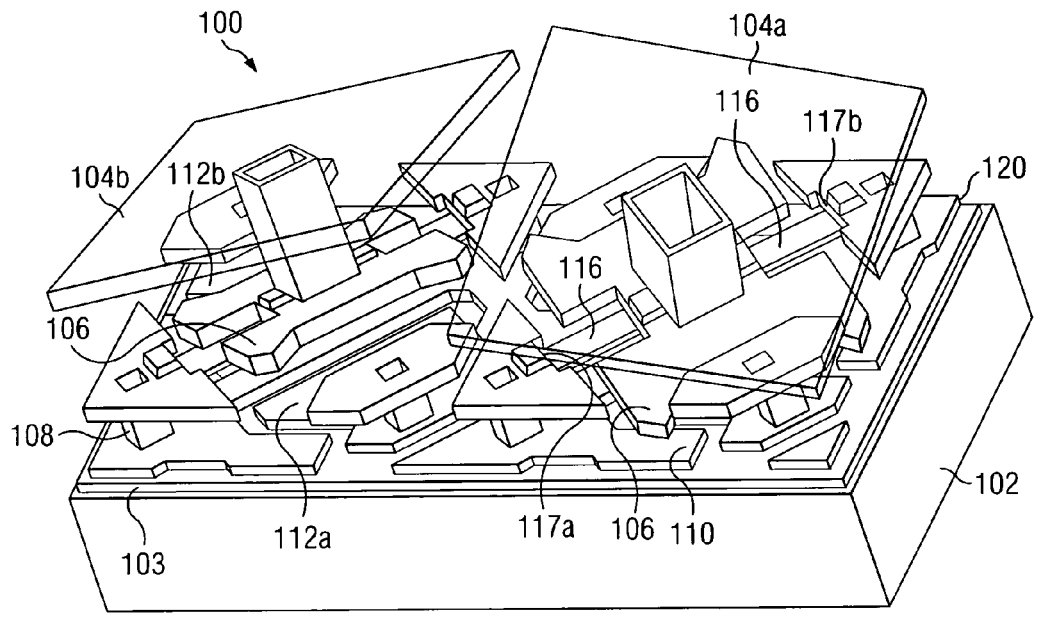
FIG. 1 illustrates a perspective view of a portion of a spatial light modulator in accordance with a particular embodiment of the present invention.

FIG. 1 illustrates a digital micro-mirror device ("DMD") 100 in accordance with a particular embodiment of the present invention. As shown in FIG. 1, DMD 100 comprises a micro electromechanical switching ("MEMS") device that includes an array of hundreds of thousands of tilting micro-mirrors 104. In this example, each micro-mirror 104 is approximately 13.7 square microns in size and has an approximately one micron gap between adjacent micro-mirrors. In some examples, each micro-mirror can be less than thirteen square microns in size. In other examples, each micro-mirror can be approximately seventeen square microns in size. In addition, each micro-mirror 104 may tilt up to plus or minus ten degrees creating an active "on" state condition or an active "off" state condition. In other examples, each micro-mirror 104 may tilt plus or minus twelve degrees for the active "on" state or "off" state.

In this example, each micro-mirror 104 transitions between its active "on" and "off" states to selectively communicate at least a portion of an optical signal or light beam. To permit micro-mirrors 104 to tilt, each micro-mirror 104 is attached to one or more hinges 116 mounted on hinge posts 108, and spaced by means of an air gap over a complementary metal-oxide semiconductor ("CMOS") substrate 102. In this example, micro-mirrors 104 tilt in the positive or negative direction until yoke 106 contacts conductive conduits 110. Although this example includes yoke 106, other examples may eliminate yoke 106. In those examples, micro-mirrors 104 tilt in the positive or negative direction until micro-mirrors 104 contact a mirror stop or a plurality of springtips (not explicitly shown).

In this particular example, electrodes 112 and conductive conduits 110 are formed within a conductive layer 120 disposed outwardly from an oxide layer 103. Conductive layer 120 can comprise, for example, an aluminum alloy or other suitable conductive material. Oxide layer 103 operates to insolate CMOS substrate 102 from electrodes 112 and conductive conduits 110. Conductive layer 120 receives a bias voltage that at least partially contributes to the creation of the electrostatic forces developed between electrodes 112, micro-mirrors 104, and/or yoke 106.

In this particular example, CMOS substrate 102 comprises the control circuitry associated with DMD 100. The control circuitry can comprise any hardware, software, firmware, or combination thereof capable of at least partially contributing to the creation of the electrostatic forces between electrodes 112, micro-mirrors 104, and/or yoke 106. The control circuitry associated with CMOS substrate 102 functions to selectively transition micro-mirrors 104 between "on" state and "off" state based at least in part on data received from a processor (not explicitly shown). As shown in FIG. 1, micro-mirror 104a is positioned in the active "on" state condition, while micro-mirror 104b is positioned in the active "off" state condition. The control circuitry transitions micro-mirrors 104 between "on" and "off" states by selectively applying a control voltage to at least one of the electrodes 112 associated with a particular micro-mirror 104. For example, to transition micro-mirror 104b to the active "on" state condition, the control circuitry removes the control voltage from electrode 112a and applies the control voltage to electrode 112b.

To facilitate the reflection of incident light, conventional DMDs utilize micro-mirrors comprising at least a surface layer of an aluminum alloy, such as a 98.6:1:0.2 alloy of aluminum, titanium, and silicon. These materials provide adequate reflectivity for a number of applications. However, in particular applications, it may be desirable to increase the reflectivity of the micro-mirrors beyond that provided by conventional aluminum alloys. Accordingly, in particular embodiments of the present invention, micro-mirrors 104 of DMD 100 comprise an aluminum alloy including small amounts of copper. For example, in particular embodiments of the present invention, micro-mirrors 104 may comprises from about 0.1% to about 2.0% at. copper. In particular embodiments, the micro-mirrors may comprise about 0.5% at copper. In particular embodiments, the Al—Cu alloys may also comprise chromium or titanium.

By incorporating small amounts of copper, aluminum alloys in accordance with particular embodiments of the present invention have been able to offer increased reflectivity over conventional materials. Extensive testing and analysis of Al—Cu alloys comprising up to about 2.0% copper have indicated that particular embodiments of the present invention may have a reflectance coefficient of about 90% (i.e., the micro-mirror surface reflects approximately 90% of incident light) or above at wavelengths between about 250 nm and about 575 nm. For example, micro-mirrors in accordance with particular embodiments of the present invention may exhibit a reflectance coefficient of about 90% at a wavelength of about 550 nm, which is more than a 4% increase over conventional materials.

Generally, the Al—Cu alloys of the present invention offer enhanced micro-mirror reflectivity relative to conventional aluminum alloys, while satisfying the various material constraints associated with conventional DMD processing. These constraints may include mechanical stability, low film stress, compatibility with conventional semiconductor processing (such as low temperature sputter deposition), and stability in a hermetic package containing passivation. Because of this compatibility, Al—Cu alloys in accordance with particular embodiments of the present invention may be integrated into existing DMD fabrication processes without substantial modification of existing machinery or processing techniques flows. Moreover, these Al—Cu alloys are generally not prone to surface-induced stresses, such as hillocking, that may compromise the reflective properties of the material. Additionally, such Al—Cu alloys are generally adequately conductive to facilitate the charge carrying capability of micro-mirror 104.

Figure 2A:
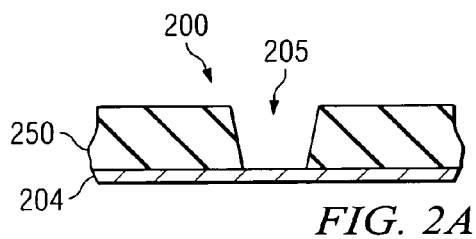
FIG. 2A illustrates a cross-sectional view of a micro-mirror in accordance with a particular embodiment of the present invention prior to formation of mirror layer and a mirror post.
Figure 2B:
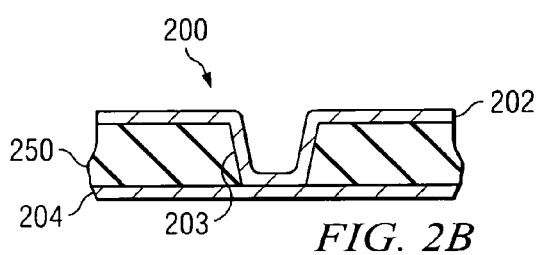
FIG. 2B illustrates a cross-sectional view of the micro-mirror shown in FIG. 2A after formation of a mirror layer and a mirror post.
Figure 3:
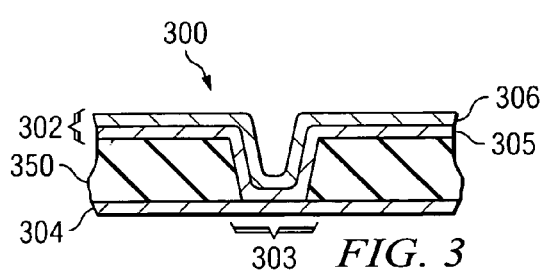
FIG. 3 illustrates a cross-sectional view of another micro-mirror in accordance with a particular embodiment of the present invention.

A better understanding of various aspects of the present invention may be had by making reference to FIGS. 2A, 2B, and 3, which illustrate various DMD structures in accordance with particular embodiments of the present invention.

FIGS. 2A and 2B illustrate cross-sectional views of a portion of a DMD 200 at various stages of completion. Specifically, FIG. 2A illustrates DMD 200 prior to the deposition of the mirror metal, while FIG. 2B illustrates DMD 200 after deposition of the mirror metal.

As shown in FIG. 2A, DMD 200 comprises a hinge layer 204 and a second sacrificial layer 250, including a mirror support via 205, disposed outwardly upon the hinge layer. Generally, the relatively thin hinge layer 204 may be deposited upon the free surface of a previously deposited, first sacrificial layer (not explicitly shown). Typically, this is done by sputtering the hinge material onto the sacrificial layer. Generally, hinge layer 204 may comprise any suitable material. In particular embodiments, hinge layer 204 may comprise aluminum, oxygen, titanium, silicon, polysilicon, tungsten, nitride, and/or a combination thereof. In one embodiment, hinge layer 204 is formed by depositing an aluminum alloy, such as a 98.6:1:0.2 alloy of aluminum, titanium, and silicon, to a thickness of 500 to 1000 angstroms. Once the hinge layer 204 is deposited, selective patterning and etching of the layer may be used to form hinges and support posts, such as those shown in FIG. 1.

Second sacrificial layer 250 may be formed on top of hinge layer 204 using a variety of processes. For example, in particular embodiments, second sacrificial layer 250 may be formed upon hinge layer 204 by depositing an oxide or photoresist material that may be selectively removed after deposition. Although FIG. 2A shows second sacrificial layer 250 and hinge layer 204 without interstitial layers between them, it should be understood that other embodiments of the present invention could include such interstitial layers. Once removed, second sacrificial layer 250 define spaces beneath the micro-mirror 202 (FIG. 2B) into which the micromirrors 102 may move when they are selectively deflected or deformed.

Sacrificial layer 250 also includes a mirror support via 205. Generally, mirror support via 205 may be formed using a variety of processes. For example, mirror support via 205 may be formed by removing a portion of second sacrificial layer 250. In a particular embodiment, mirror support via 205 may formed by patterning and etching second sacrificial layer 250 using photoresist mask and etch techniques.

FIG. 2B continues to track the formation of DMD 200 by showing DMD 200 after formation of a mirror layer 202 and mirror support post 203 outwardly from second sacrificial layer 250. Generally, mirror layer 202 comprises an alloy of aluminum and copper, having about 2% at. copper or less. In particular embodiments, mirror layer 202 may also comprise titanium, chromium, or some other suitable material. For example, in particular embodiments, mirror layer 202 comprises aluminum and copper in a 99.5:0.5 ratio. In other embodiments, mirror layer 202 may comprise aluminum, titanium, and copper or aluminum, chromium, and copper in a 97:2:1 ratio. Testing indicates these latter two alloys may improve the mechanical stability over alloys containing only aluminum and copper, while still improving reflectivity over conventional aluminum alloys. Testing also indicates that material hardness, resistivity, and stress increase as a function of copper content.

Mirror layer 202 may be formed through any of a variety of processes. For example, mirror layer 202 may be formed by depositing an Al—Cu alloy to a thickness of 3300 angstroms at approximately 200° C. upon sacrificial layer 250. Although mirror layer 202 and second sacrificial layer 250 are shown as being formed without interstitial layers between them, such interstitial layers could alternatively be formed without departing from the scope of the present disclosure. One or more micro-mirrors (not explicitly shown) may be formed within mirror layer 202 through any of a variety of processes. For example, the micro-mirrors may be formed by removing a portion of mirror layer 202. In particular embodiments, the micro-mirrors may be formed by patterning and etching mirror layer 202.

Although FIGS. 2A and 2B illustrate a single mirror layer 202, particular embodiments of the present invention may also utilize multi-layer mirror structures. One such embodiment is shown in FIG. 3, which illustrates a cross-sectional view of a DMD 300 having a multi-layer mirror structure 302.

Similar to DMD 200 illustrated in FIGS. 2A and 2B, DMD 300 comprises a second sacrificial layer 350 deposited outwardly upon a hinge layer 304, which have substantially the same structure and function as the hinge layer 204 and second sacrificial layer 250 of FIGS. 2A and 2B. Likewise, although layers 304 and 350 are shown without interstitial layers between respectively adjacent layers, particular embodiments could include such interstitial layers without departing from the scope of the present disclosure. DMD 300 further comprises a mirror support post and a multi-layer mirror layer 302, comprising a lower mirror layer 310 and an upper mirror layer 312, deposited outwardly upon sacrificial layer 350. In particular embodiments, such a multi-layer structure may provide a more mechanically stable mirror post 303, while improving micro-mirror reflectivity by the formation of a highly reflective upper mirror layer 312.

Generally, lower mirror layer 310 may comprise any suitable metal or metallic material. For example, in particular embodiments, lower mirror layer 310 may comprise aluminum, copper, titanium, silicon, chromium, or a combination thereof. In a particular embodiment, lower mirror layer 310 comprises aluminum, titanium, and silicon in a percent ratio of about 98.6:1:0.2. It will be understood by one of ordinary skill in the art, however, that other percent ratios may be used without departing from the scope of the present disclosure. Lower mirror layer 310 may be formed through any of a variety of processes. For example, lower mirror layer 310 can be formed by depositing an aluminum alloy to a thickness of 2300 angstroms at approximately 200° C. upon sacrificial layer 350.

In contrast to lower layer 310, upper mirror layer 312 generally comprises an alloy of aluminum and copper. Typically, copper comprises less than about 2% of the alloy. In particular embodiments, the Al—Cu alloy may also comprise titanium and/or chromium. In this particular embodiment, upper mirror layer 312 comprises Al:Cu in the percent ratio of about 99.5:0.5, although other percent ratios or alloys of aluminum and copper may be used without departing from the scope of the present disclosure. For example, in particular embodiments, upper mirror layer 312 may comprise aluminum, titanium, and copper in the percent ratio of about 97:2:1, while in other embodiments, upper mirror layer 312 may comprise aluminum, chromium, and copper in the percent ratio of about 97:2:1. Upper mirror layer 312 may be formed through any of a variety of processes. For example, in particular embodiments, upper mirror layer 312 may be formed by depositing an Al—Cu alloy to a thickness of 1000 angstroms at approximately 200° C. upon lower mirror layer 310.

One or more micro-mirrors (not explicitly shown) may be formed within mirror layer 302 through any of a variety of processes. For example, the micro-mirrors may be formed by removing a portion of mirror layer 302. In particular embodiments, the micro-mirrors may be formed by patterning and etching lower mirror layer 310 and upper mirror layer 312 substantially simultaneously.

Figure 4:
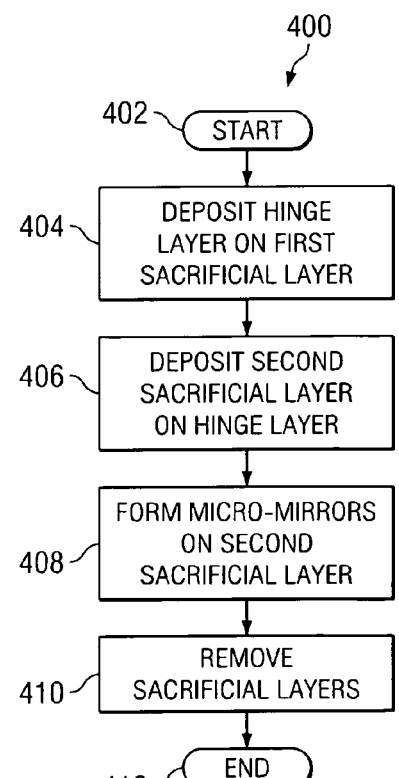
FIG. 4 illustrates a flowchart of a method of forming a spatial light modulator in accordance with a particular embodiment of the present invention.

FIG. 4 illustrates a flowchart 400 of a method of forming a portion of a spatial light modular in accordance with a particular embodiment of the present invention. Flowchart 400 begins at block 402. In block 404, a hinge layer is deposited upon the free surface of a previously deposited, first sacrificial layer. Typically, this is done by sputtering an aluminum alloy to a thickness of 500 to 1000 angstroms onto the first sacrificial layer. Once the hinge layer is deposited, selective patterning and etching of the hinge layer may be used to form hinges and support posts, such as those of FIG. 1. A second sacrificial layer, typically comprising oxide or photoresist, is then deposited on the hinge layer in block 406. The deposited second sacrificial layer is then patterned and etched to form mirror support vias, such as shown in FIG. 2A. Micro-mirrors are then formed on second sacrificial layer in block 408. Forming micro-mirrors may include low-temperature sputter deposition of one or more confronting mirror layers to a cumulative thickness of approximately 3300 angstroms. Each mirror layer typically comprises an aluminum alloy. The outermost mirror layer comprises an aluminum alloy having small amounts of copper. For example, the outermost mirror layer may comprise aluminum and copper in a 99.5:0.5 ratio. During the mirror deposition process, portions of the mirror layer or layers may deposit within the mirror support vias to form mirror support posts, such as those shown in FIGS. 1 and 2B. The mirror layer or layers are then patterned and etched to form one or more micro-mirrors. In block 410, the first and second sacrificial layers are removed, typically by a plasma-ash. Removing the sacrificial layers frees the micro-mirrors and provides space for each micro-mirror to pivot or deflect. Flowchart 400 then terminates in block 412.

By utilizing an aluminum alloy mirror metal containing small amounts of copper, particular embodiments of the present invention are able to offer increased micro-mirror reflectivity compared to conventional Al:Si:Ti alloys. In particular embodiments, this may be achieved while satisfying various material constraints associated with conventional DMD processing, such as reducing film stress, improving micro-hardness relative to pure aluminum, and being compatible with semiconductor processing. Furthermore, particular embodiments may be able offer this increased reflectivity without an increase in the amount of hillocking in the alloy used to fabricate micro-mirrors. In fact, in particular embodiments, the amount of hillocking in the micro-mirror alloy may actually be reduced.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A light processing system comprising:
   a light source operable to provide a light beam along a light path;
   a spatial light modulator positioned in the light path, the spatial light modulator comprising an array of pixel elements, each pixel element comprising a deformable micro-mirror having a reflectance of approximately ninety percent and operable to reflect the light beam in at least one direction;
   a controller electrically connected to the spatial light modulator, the controller operable to provide electrical signals to the spatial light modulator to cause the spatial light modulator to selectively deform the pixel elements thereby selectively reflecting incident light beams along a projection light path; and
   wherein at least a portion of each deformable micro-mirror comprises an Al—Cu alloy comprising at most about 2% at. copper deposited at approximately 200° C.

2. The spatial light modulator of claim 1, wherein the Al—Cu alloy further comprises an element selected from the group consisting of chromium and titanium.

3. The spatial light modulator of claim 1, wherein each deformable micro-mirror comprises one or more layers.

4. The spatial light modulator of claim 3, wherein an outermost layer of each micro-mirror comprises the Al—Cu alloy.

5. The spatial light modulator of claim 1, wherein each micro-mirror has a reflectance coefficient greater than about 90% at least one wavelength between about 250 nm and about 575 nm.

6. A light processing system comprising:
   a light source operable to provide a light beam along a light path;
   a spatial light modulator positioned in the light path, the spatial light modulator comprising an array of pixel elements, each pixel element comprising a deformable micro-mirror deposited at approximately 200° C. operable to reflect the light beam in at least one direction;
   a controller electrically connected to the spatial light modulator, the controller operable to provide electrical signals to the spatial light modulator to cause the spatial light modulator to selectively deform the pixel elements thereby selectively reflecting incident light beams along a projection light path; and
   wherein at least a portion of each deformable micro-mirror comprises an Al—Cu alloy having a reflectance of approximately ninety percent and is substantially devoid of silicon; and the deformable micro-mirror further comprises at least two layers.

7. The light processing system of claim 6, wherein the Al—Cu alloy further comprises an element selected from the group consisting of chromium and titanium.

8. The light processing system of claim 6, wherein an outermost layer of each micro-mirror comprises the Al—Cu alloy.

9. The light processing system of claim 6, wherein the Al—Cu alloy comprises at most about 2% at. copper.

10. A method of forming a spatial light modulator, comprising:
    depositing a hinge layer on a free surface of a first sacrificial layer;
    forming a plurality of hinges by selectively patterning and etching the hinge layer;
    depositing a second sacrificial layer on the hinge layer;
    forming mirror support via by patterning and etching the second sacrificial layer;
    depositing at a low temperature at least one mirror layer comprising an Al—Cu alloy;
    forming a plurality of micro-mirrors, by patterning and etching the second sacrificial layer, at least a portion of each micro-mirror comprising an Al—Cu alloy that is substantially devoid of silicon; and
    coupling the plurality of micro-mirrors to a substrate comprising circuitry operable to selectively deform the micro-mirrors to form the pixels of an image.

11. The method of claim 10, wherein the Al—Cu alloy comprises at most about 2% at. copper.

12. The method of claim 10, wherein the Al—Cu alloy further comprises an element selected from the group consisting of chromium and titanium.

13. The method of claim 10, wherein each deformable micro-mirror comprises one or more layers.

14. The method of claim 13, wherein an outermost layer of each micro-mirror comprises the Al—Cu alloy.

15. The method of claim 10, wherein each micro-mirror has a reflectance coefficient greater than about 90% at least one wavelength between about 250 nm and about 575 nm.

16. The method of claim 10, wherein depositing at a low temperature further comprises depositing by low temperature sputter deposition.

* * * * *